Figure 1:
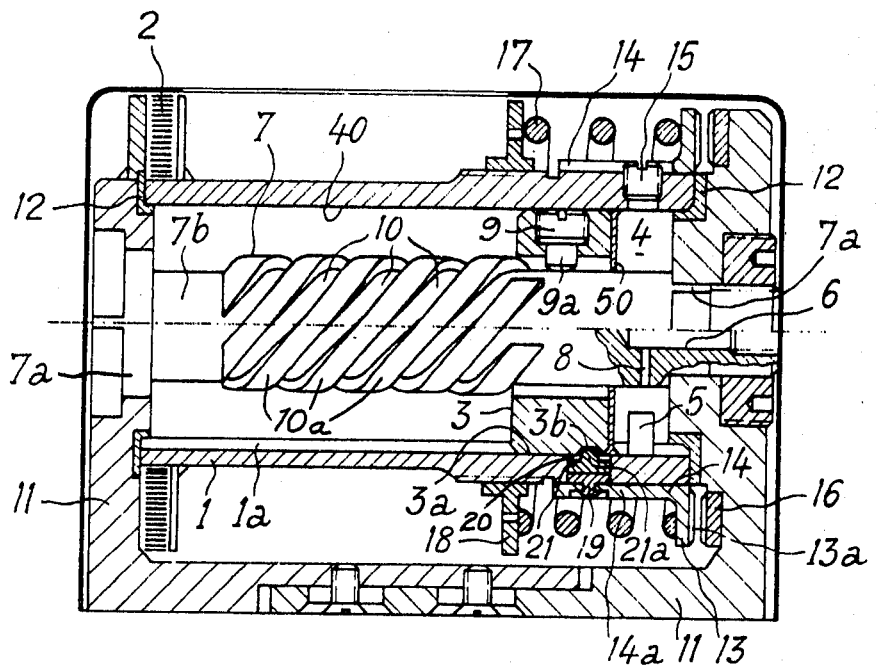

United States Patent [19]
Doin et al.

[11] 3,970,266
[45] July 20, 1976

[54] DEVICE FOR WINDING A SEAT BELT IN VEHICLES

[75] Inventors: Bernard J. Doin; Bernard E. Plantif, both of Saint Medard en Jalles; Jean-Francois Tillac, Bordeaux Cauderan, all of France

[73] Assignee: Societe Nationale des Poudres et Explosifs, France

[22] Filed: Apr. 3, 1975

[21] Appl. No.: 564,730

[30] Foreign Application Priority Data
Apr. 25, 1974 France .............................. 74.14504

[52] U.S. Cl. .................... 242/107.4 R; 74/89.15; 242/107.4 B
[51] Int. Cl.² .................................... B65H 75/48
[58] Field of Search ............. 242/107.4 R, 107.4 A, 242/107.4 B; 244/122; 74/89.15 X

[56] References Cited
UNITED STATES PATENTS

| | | | |
|---|---|---|---|
| 2,843,335 | 7/1968 | Hoven ......................... | 242/107.4 B |
| 3,077,324 | 2/1963 | Strickland ..................... | 242/107.4 B |
| 3,531,061 | 9/1970 | Davies ......................... | 242/107.4 B |
| 3,845,836 | 11/1974 | Bendler ....................... | 242/107.4 R X |
| 3,871,470 | 3/1975 | Schwanz ....................... | 242/107.4 R |

*Primary Examiner*—Edward J. McCarthy
*Attorney, Agent, or Firm*—Bucknam and Archer

[57] ABSTRACT

A device for winding up a vehicle seat belt in the event of a vehicle impact comprises a hollow winding drum rotatably mounted in a casing coaxially surrounding a threaded central axle which is rotationally fast with the casing. An annular piston inserted between the drum and axle is axially movable by the pressure generated by combustion gases issuing from a pyrotechnic charge detonated by a signal from an impact detector, to rotate the drum and wind up the belt, the piston being keyed for rotation with the drum and for helical movement relative to the axle. Under normal conditions the drum is free to rotate to wind up and unwind the belt, but a mechanism is automatically actuated upon impact to prevent or oppose rotation of the drum in an unwinding direction.

11 Claims, 2 Drawing Figures

DEVICE FOR WINDING A SEAT BELT IN VEHICLES

This invention relates to a winding-up device, such as for use with a vehicle safety belt including a casing, a drum on which the belt can be wound and optionally means for rotating the drum to wind up the belt or lock the drum against rotation, a collision detector, drive means for rotating the drum to wind up the belt comprising a piston delimiting a pressure chamber within a bore in which the piston can travel over a limited path, and triggering means connected to the collision detector and operable to pressurize the pressure chamber with fluid in response to a control signal emitted by the collision detector.

Devices for tightening safety belts used to protect people in vehicles have been known for several years. These tightening devices make it possible to position the safety belt in contact with a person to be protected only when a collision takes place, leaving the person completely free to move under normal conditions.

A first group of such devices consists of pyrotechnic jacks employing linear traction but, since in practice the traction distance must be at least 16 cm, a linear traction device must have a total length of approximately 40 cm and these dimensions lead to considerable difficulty when positioning the device in the passenger compartment of a vehicle. There is also a danger of accidents occurring due to carelessness when the system is in its normal extended condition. Linear pyrotechnic jacks are described, for example, in French Patent 2,190,015 in the name of the Societe Nationale des Poudres et Explosifs and in French Patent 2,213,231 in the name of the Regie Nationale des Usines Renault and of the Societe des Automobiles Peugeot.

A second kind of tensioning device consists of a winding-up device. Existing winding-up devices comprise a piston displaceable by control components to actuate a transmission system which may be either a rack and pinion combinatin or a combination possessing a helicoidal screw. such devices tend to be of large overall size because the transmission system forms an extension of the piston. The following three patents described winding-up devices comprising a linear jack and a transmission system:

British Patent 1,012,353 which relates to a transmission system employing a rack and pinion combination; and French Patent 1,231,466 and U.S. Pat. No. 3,531,061 which disclose devices comprisig a transmission system employing a combination including helicoidal screws.

There is also known a winding-up device possessing a pyrotechnic turbine, like that described in French Patent 2,136,755 in the name of Messrs. Dynamit Nobel AG, but with these winding-up devices it is not possible to develop a high torque and, moreover, they require the high temperature combustion gases to be discharged.

The present invention aims at avoiding the disadvantages of the known devices and accordingly provides a device for winding up an elongate flexible element, such as a vehicle safety belt, comprising a casing, an axle mounted in the casing and rotationally fast therewith, a hollow drum rotatably mounted in the casing coaxial with and surrounding the axle, an annular piston positioned between the drum and axle and axially movable relative thereto, an annular pressure chamber defined within the drum adjacent one end thereof by the piston in an initial position thereof, a pyrotechnic charge for pressurising the pressure chamber with combustion gases therefrom to propel the piston axially along the drum and axle away from its initial position, first cooperable guide means on the piston and the drum, and second cooperable guide means on the piston and the axle, the first and second guide means being so arranged that the piston is rotationally fast with one of the drum and axle, and is movable along a helicoidal path relative to the other of the drum and axle, whereby axial displacement of the piston by the combustion gases causes the drum to be rotated for winding the flexible element on to the drum.

When used for tightening vehicle safety belts a device of this construction may possess only a small overall size and can develop a high drive torque for the drum which is necessary since the safety belt must be wound up within periods of time of the order of 20 to 40 milliseconds.

The annular piston itself, together with the winding-drum and the fixed central axle, form a transmission system which converts the translational displacement of the piston into a rotational movement of the winding drum.

In a preferred embodiment of the invention, at least one of the guide means is interrupted in the vicinity of the initial position of the annular piston, in such a way that the winding drum can rotate without the annular piston travelling axially. This makes it possible to produce a coupling system which avoids immobilising the winding drum so that it cannot rotate, but which allows the piston to remain in its initial axial position which is determined so as to provide an initial volume of the pressure chamber which permits rapid firing of the pyrotechnic charge. Moreover, the winding-up device can have winding-back means, which are in themselves known, such as a spiral spring.

The piston may be rotationally fast with the drum, the first guide means including at least one linear groove on the inner surface of the drum and at least one projection on the piston which engages in the groove. The second guide means may include at least one helicoidal groove in the axle and at least one projection on the piston which cooperates with the helicoidal groove. Such a construction is advantageous because it is easily produced industrially, and makes it possible to provide a compact coupling.

In an alternative construction the first guide means permits helical movement of the piston relative to the drum and comprises at least one helicoidal groove. The second guide means holds the piston rotationally fast with the axle and may include at least one axial groove.

At least one of the guide means is preferably interrupted in the region of the end of travel position of the annular piston, to allow the drum to rotate freely when the piston reaches the end of travel position. With the uncoupling at the end of travel of the annular piston, it is possible for the winding drum to continue to rotate, rotational kinetic energy of the annular piston being communicated to this winding drum which thus continues to pull on the safety belt.

The device may include a retaining mechanism, which permits rotation in only one direction or opposes rotation in at least one direction of rotation, interposed between the winding drum and the casing of the device.

In one embodiment, the mechanism comprises a ring, mounted on the winding drum and rotatable with this drum, and which can mesh with another ring firmly fixed to the casing. The ring mounted on the winding drum may be axially movable, a detachable stop holding the ring at a distance from the ring fixed to the casing of the device when the piston is in its initial position, and releasing the ring for axial movement when the annular piston travels away from its initial position under the effect of the combustion gases from the pyrotechnic charge, so that the winding drum can rotate freely in both directions, as long as the pyrotechnic charge is not fired.

The pyrotechnic charge may be at least partially, and preferably completely, seated in a recess in the end of the central axle which is situated adjacent the initial position of the annular piston. The pyrotechnic charge preferably consists of igniters, an auxiliary igniting charge and a main pyrotechnic charge having a short duration of combustion.

Figure 2:
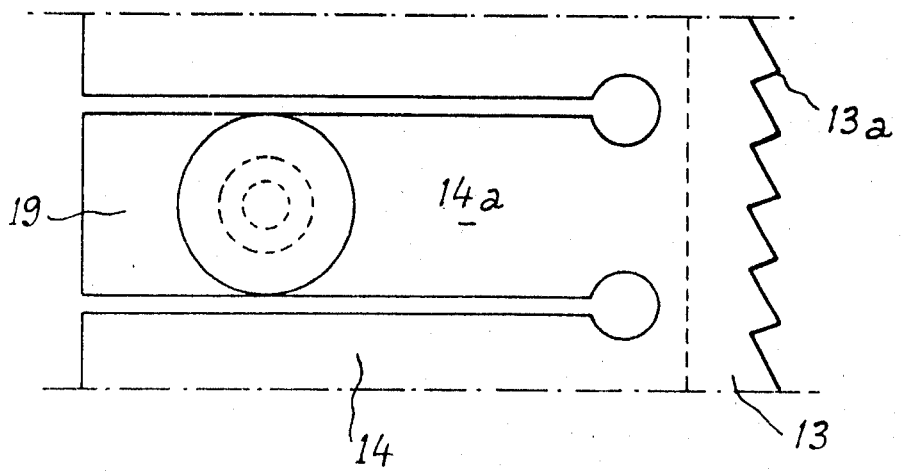

A preferred embodiment of the invention is described in detail below, by way of example with reference to the accompanying drawing, in which:

FIG. 1 is an axial cross-section through a vehicle safety belt winding-up device in accordance with the invention; and FIG. 2 is a partial plan view of the lower part of the non-return system of the device shown in FIG. 1.

The device comprises a winding drum 1 for the belt, a spiral spring 2 for rotating the drum to wind up the belt, a collision detector (not shown), drive means for rotating the drum 1 to wind the belt on to the drum, and triggering means connected to the collision detector and actuable to operate the drive means by a control signal emitted by the collision detector.

The drive means includes an annular piston 3 delimiting a pressure chamber 4 which contains a pyrotechnic charge 5, within an axial bore 40 of the drum, the piston 3 can travel in the bore over a limited path and in a leakproof manner ensured by seal 50. The triggering means consist of an auxiliary igniting charge and igniters (not shown) arranged in a bore 6 formed at one end of a fixed central axle 7 and communicating with the pressure chamber 4 via radial passages 8 in the axle 7.

The piston 3 carries a protection provided by the shank 9a of a radial screw 9, which can cooperate with any one of several parallel helicoidal grooves 10 in the axle 7. The grooves are coaxial with the axis of the piston 3 and have a square cross-section and a sprial slope of 60°. The piston 3 is fast for rotation with the drum 1 due to three keying projections 3a on the piston 3, which fit into and are axially slidable in longitudinal keying grooves 1a in the drum bore 40.

The central axle 7 is held fixed relative to the passenger compartment of the vehicle by means of casing 11 in which the square cross-section end portions 7a of axle 7 are held against rotation. The casing is fixed to the chassis of the vehicle (not shown). The winding drum 1 which coaxially surrounds the axle 7 is equipped with means which are not represented for attaching the belt, and is mounted for rotation about its axis by opposite end bearings in the form of bronze rings 12 carried by the casing 11.

The main pyrotechnic charge 5 equipped with its firing device consists of two ultra-rapid electric igniters and 0.6 gram of a live igniting powder based on zirconium and copper oxide, the main charge consisting of strands of double-base (nitrocellulose and plasticised nitroglycerine) homogeneous solid propellant, these strands, the total weight of which is 2.8 grams, having a hexagonal cross-section and being pierced with 19 holes in order to provide a very short combustion time. With a winding drum having a bore 40 mm in diameter, the average recorded operating pressure is 200 bars, and the maximum pressure in no case exceeded 310 bars. The ignition delay observed is approximately 3.5 milliseconds and the maximum force on the safety belt is produced after 15 milliseconds and can reach a maximum value of 970 decaNewtons.

The axle 7 on which the annular piston 3 is mounted is equipped with the helicoidal grooves 10 only over a medial portion. At each end, the axle 7 possesses a clear, constant diameter portion 7b into which all the hellicoidal grooves 10 open, the diameter of these portions 7b being less than the outer diameter of the grooved medial portion of the axle 7. The threads 10a defining the grooves 10 are interrupted at the end portions 7b in such a way that the projection 9a of the piston 3 can enter and travel along the grooves to rotate the piston 3 about its axis as it travels along the axle. At the end of the piston travel, to the left as seen in FIG. 1, the projection disengages from the threads and the drum 1 can continue to rotate and dissipate its rotational kinetic energy whilst continuing to wind up the safety belt. The end portion 7a, which has a square cross-section situated at the end of the axle towards which the position travels, forms an axial stop for the piston 3. This coupling system avoids immobilising the winding drum so that it cannot rotate under normal conditions, the piston rotating with the drum 3a and the grooves 1a due to the engagement between keying projections when in its initial longitudinal position, which permits rapid firing of the igniting charge. Thus, during normal operation of the vehicle, the safety belt can be unwound from the drum and wound up again by the spiral spring 2. A person wearing the belt is pulled back and held on his seat only when an impact causes the pyrotechnic charge to be fired by electric impulse emitted by the collision detector.

A mechanism, which permits rotation in one direction only or which offers resistance or clamps rotating in a single direction is interposed between the winding drum 1 and the casing 11. In the illustrated embodiment, the retaining mechanism is of the former non-return kind and is brought into use automatically by displacement of the piston 3 from its normal, initial position.

The non-return mechanism comprises a ring 13, the front face 13a of which is equipped with radial ribs or teeth of a saw-tooth cross-section. The ring 13 forms part of a socket 14 axially slidably mounted on the drum for rotation with the drum. Screws 15 ensure that the socket is fast for rotation with the drum.

The ring 13 can cooperate with a corresponding ring 16 fixed to the casing 11, when the ring 13 is pressed, with its front face 13a into engagement with the fixed ring 16 by a prestressed compression spring 17 acting between the ring 13 and an annular member 18 fixed in an adjustable axial position on the drum 1. The socket 14 is normally held against axial translational movement relative to the drum by a pellet 19 which is riveted to an elastic tab 14a (FIG. 2) forming a portion of the socket 14. The pellet projects from the inner surface of the socket 14 into a hole 20 in the wall of the drum 1. In the hole 20, there is also inserted a resilient element 21 having, on its side opposite the pellet 19, a lug with a hemispherical bearing surface 21a engaged in an annular groove 3b of trapezoidal cross-section 3b in the periphery of the piston 3.

When the pyrotechnic charge 5 is fired, the piston 3 is shifted towards the left, as seen in FIG. 1, and the resilient element 21 frees the pellet 19 from the hole 20, thus releasing the socket 14 for axial movement under the action of the spring 17 to press the ring 13 against the fixed ring 16. When the rings 13 and 16 are in engagement the drum can only rotate in one direction that being to wind the seat belt on to the drum.

Of course, the non-return mechanism described could be replaced by any other arrangement which would carry out the same function, such as a friction system.

Various modifications are possible to the described device, for example, the annular piston to possess only limited projections or even no projection when it is in its initial position, the coupling of the piston with the grooves of the winding drum and of the fixed axle, and the sealing being provided at least partially by a ring of deformable material, which will press against the various grooves at the instant of firing the pyrotechnic charge, in a manner similar to the driving belts for shells which are fired from cannons with a rifled bore in order to cause the shell to rotate about its axis.

To compensate for the reaction force which acts on the attachments connecting the casing of the device to the chassis of the vehicle, during the combustion of the pyrotechnic charge and the propulsion of the piston, it is possible either to juxtapose directly two winding-up devices according to the invention, or to secure them to one another. In order to avoid excessive overall size, a single fixed central axle may be employed, and a single pyrotechnic charge positioned between two annular pistons. In this case it is possible for the wind-up directions of rotation of the drums, which can be combined to form a single drum, to be made the same by reversing the direction of the slope of the helicoidal groove on the separate axle portions.

We claim:

1. A device for winding up an elongate flexible element, such as a vehicle safety belt, comprising a casing, an axle mounted in said casing and rotationally fast therewith, a hollow winding-drum rotatably mounted in said casing coaxial with and surrounding said axle, an annular piston positioned between said drum and axle and axially movable relative thereto between initial and final positions, an annular pressure chamber defined within said drum by said piston in said initial position thereof, a pyrotechnic charge for pressurising said pressure chamber with combustion gases therefrom to propel said piston axially along said drum and axle from said initial position, to said final position, first cooperable guide means on said piston and said drum, and second cooperable guide means on said piston and said axle, said first and second guide means being so arranged that said piston is rotationally fast with said drum or said axle and is movable along a helicoidal path relative to said axle when the piston is rotationally fast with said drum and is movable along a helicoidal path relative to said drum when the piston is rotationally fast with said axle, whereby axial displacement of the piston by the combustion gases causes said drum to be rotated for winding said flexible element on to said drum.

2. A device according to claim 1, wherein at least one of said first and second guide means is interrupted in the vicinity of said initial position of said piston, whereby when said piston is in the initial position the winding drum can rotate freely without said piston being displaced axially.

3. A device according to claim 1, said first guide means comprises at least one axially extending groove for retaining said piston rotationally fast with said drum, and said second guide means comprises at least one helically extending groove.

4. A device according to claim 3, wherein the drum has an inside surface, at least one axially extending groove is formed on said inner surface of said winding drum and at least two helically extending grooves are formed on said axle, said piston having at least one outwardly protruding projection for cooperation with said axial grooves and at least one inwardly protruding projection for cooperation with said helically extending grooves of said axle.

5. A device according to claim 3, wherein said second guide means are interrupted in the vicinity of said initial position of said piston.

6. A device according to claim 1, wherein at least one of said first and second guide means is interrupted in the region of said final position of said piston, whereby said drum can rotate freely when said piston is in said final position.

7. A device according to claim 4, wherein said axle has a portion of constant diameter into which all the helicoidal grooves of said second guide means open.

8. A device according to claim 1, including a retaining mechanism interposed between said drum and said casing, which permits relative rotation of said drum and casing in only one direction, or which opposes said relative rotation in at least one direction.

9. A device according to claim 8, wherein said retaining mechanism comprises a first ring mounted on said winding drum for rotation therewith, and a second ring fixed to said casing and arranged to mesh with said first ring.

10. A device according to claim 9, wherein said first ring is axially movable relative to said drum, and a detachable stop holds said first ring spaced from said second ring when said piston is in its initial position, said stop releasing said first ring for axial movement into engagement with said second ring when said piston is displaced from said initial position under the effect of said combustion gases from said pyrotechnic charge.

11. A device according to claim 1, wherein said axle has opposed ends and a recess at said end thereof adjacent said initial position of said piston, and said pyrotechnic charge is at least partially located in said recess.

* * * * *